Patented Dec. 7, 1937

2,101,614

UNITED STATES PATENT OFFICE 2,101,614

METHOD OF MAKING A PAVING MATERIAL

James W. Fraser, Cleveland, Ohio

No Drawing. Application August 26, 1935,
Serial No. 37,981

3 Claims. (Cl. 106—31)

This invention relates to a composition suitable for the construction of pavements, walks, tennis courts and the like and particularly to improved asphalt concrete and methods of making the same. The composition and method of the present invention are improvements over the composition and method disclosed in my prior patent for Asphaltic concrete paving, No. 1,757,661, granted May 6, 1930.

As pointed out in said patent, improved asphalt concrete suitable for pavements is obtained by combining natural maltha contained in rock asphalt with asphaltic cement thereby producing a bituminous material that is more adhesive, more ductile and self-healing than the usual bituminous binder obtained from blown oils or even natural asphalt materials on account of high percentage of hydrocarbons of the malthene group incorporated in the improved binder.

I have found that the addition of maltha such as found in sand rock in Kentucky and limestone rock in Ohio to asphaltic cement or asphalt pitch in a ratio of 1:4 provides maximum cementing value, adhesiveness, ductility and other desirable properties sought in paving materials regardless of the method by which the combination is effected provided that the method does not require excessive heating with resultant cracking of the maltha which converts the same into hard brittle compounds of little or no value as a binder. The proportions of maltha to cement may vary between 1:3 to 1:5 by weight with satisfactory results. This discovery is the basis of my co-pending application, Serial Number 755,832 for Asphalt paving composition and method of making same issuing March 31, 1936 as Patent No. 2,036,130.

Attempts have been made to utilize limestone rock asphalt from Texas deposits in road building by adding a soft fluxing material. As the asphalt contained in such limestone rock is truly asphaltic pitch and quite hard these attempts have not been successful and in reality did not utilize the asphalt content of the rock. Other attempts to use limestone rock asphalt containing maltha involve heating to a high temperature in a dryer and these attempts were unsuccessful because the exposure of the maltha or maltha-containing sand or rock to a high temperature is harmful and destroys the useful properties of adhesiveness and ductility of the natural maltha. Also where asphaltic cement was added, the proportions of maltha to cement were approximately in the ratio of 1:1.

The object of the invention is to obtain a greatly improved composition utilizing the natural maltha contained in sandstone rock asphalt of Kentucky but preferably limestone rock such as that found in southern Ohio in Highland County which is almost identical with the maltha found in Kentucky sand rock and similar impregnated rock. In this rock the maltha is held in minute globules which are apparently connected together. It is therefore only necessary in carrying out the present process to crush the maltha containing rock to pass the ¾ inch screen and be retained on a ¼ inch screen so that the limestone itself may be utilized as the aggregate in the composition. The maltha impregnated limestone may be crushed to sand size if desired but in that case, the usual trap rock or other coarse aggregate must be added.

If the crushed rock is immersed in naptha or other hydrocarbon solvent or distillate at ordinary room temperature for one minute, approximately one-half of the maltha content will be extracted. If the rock is crushed to sand passing a 30 mesh screen, approximately 100 percent of the maltha is extracted in the same time.

By experiment I have found that I can successfully combine a large proportion of the maltha in the crushed limestone rock with asphaltic cement, while cold, by adding asphaltic cement made liquid by the addition of solvent such as naptha, the ratio of the extracted maltha to the asphaltic cement being preferably 1:4.

In practice the best results are obtained by using thinned asphalt or asphalt cut back consisting of asphalt cement of the desired penetration, 60 to 75 parts, and solvent naptha or other solvent, 25 to 40 parts by weight. The amount of solvent may be varied depending on the maltha content of the rock and upon air temperature in order to secure the desired fluidity of the asphalt cut back.

As a specific example, to 100 pounds of crushed maltha-containing limestone rock graded to ¾ to ¼ inch in size and containing 3% of maltha by weight, asphalt cement is added cut back with 30 to 40% of naptha. The amount of contained maltha that is commingled with the cement is approximately ¾ to 1¼ pounds. Obviously in order to maintain the ratio of maltha to cement of 1:4 approximately four pounds of asphalt cement is added, cut back with 1⅓ to 2.7 pounds of solvent. The mixing is carried on without heating the materials.

With this grading or sizing of the rock no other mineral aggregate is desirable or necessary for ordinary purposes as for ordinary pavements or walks. The solvent gradually evaporates leaving the stone coated with a bituminous material consisting of approximately one part of maltha to 3¼ to 5 parts asphaltic cement. This composition is a strong tough asphaltic concrete of ductile and self-healing character adapted to resist traffic impacts. Furthermore the concrete is highly resistant to water and oxygen and thus produces a paving surface or the like where the concrete is employed that is highly immune chemically against the effects of the seepage of moisture from underneath which seepage is largely responsible for the failure of many bituminous pavements during the last few years.

As an alternative method of making available the natural malthas contained in asphaltic sandstone or limestone, such materials may be crushed to sand size and by the addition of solvent naptha the maltha may be extracted up to practically 100% depending upon the fineness of the sand. Thus to 100 pounds of maltha-containing sand having 3 pounds available maltha are added 12 pounds of asphaltic cement cut back with from 3½ to 4¾ pounds of solvent naptha. Thus 15 pounds of combined maltha and asphaltic cement are obtained. As the 100 pounds of sand require approximately 7 pounds of binder, to this mixture is added approximately 250 pounds of crushed limestone,—slag, gravel, or like mineral aggregate. This mix then contains 250 pounds of limestone or mineral aggregate, one hundred pounds of crushed maltha sand rock or lime rock and 12 pounds of asphaltic cement cut back with 3½ to 4¾ pounds of solvent.

In both of the above methods mixing of the ingredients is accomplished by any suitable apparatus such as the rotary mixer, a pug mill or any other mixing method that causes the materials to blend.

It is to be noted that a higher percentage of solvent is specified than is usual in the asphaltic cut back. Sufficient naptha must be provided to liberate the maltha contained in the rock asphalt and may be varied somewhat depending upon the character of the asphalt and weather conditions. A small percentage of moisture in the rock asphalt or crushed rock does not materially affect the process.

The composition produced by the above described process is particularly advantageous as a paving mixture on account of the ductility and self-healing characteristics of the composition. The essence of the invention consists in extracting partially or substantially entirely the maltha from maltha-impregnated rock or rock sand in a cold state by the addition of asphaltic cement cut back with sufficient solvent not only to liquefy the cement but also dissolve the maltha from the rock, the proportion of asphaltic cement between three to five times that of the maltha. After evaporation of the naptha or other solvent, the maltha is so combined with the cement as to substantially enhance the durability, adhesiveness and ductility so that the material has desirable properties as a binder for paving compositions and the like.

As indicated above various changes may be made in the detailed processes set forth above as illustrative of the invention and may be made without departing from the scope of the invention as indicated in the appended claims.

I claim:

1. The method of making paving material which comprises cold-mixing maltha-containing rock material having a maltha content of approximately three per cent by weight with asphaltic cement made liquid by 25 to 40 parts by weight of solvent, such as naptha, to thereby obtain a ratio of extracted maltha to cement of approximately 1:4.

2. The method of making paving material which comprises cold-mixing approximately one hundred pounds of crushed maltha-containing rock graded to approximately ¾ to ¼ inch in size and having a maltha content of approximately three per cent by weight with approximately four pounds of asphalt cement cut back with 1.33 to 2.7 pounds of solvent, to thereby obtain a ratio of extracted maltha to cement of approximately 1:4.

3. The method of making paving material which comprises cold-mixing maltha-containing sand or finely-divided rock material having a natural maltha content of approximately 3 to 5½% with asphaltic cement made liquid by a solvent, such as naptha, in such proportions as will render the mass workable and at the same time extract the maltha from the material in the proportion of approximately one part of maltha to four parts of cement.

JAMES W. FRASER.